Dec. 8, 1931.  F. J. BRANNEN  1,835,007
LIQUID LEVEL INDICATOR
Filed July 8, 1929
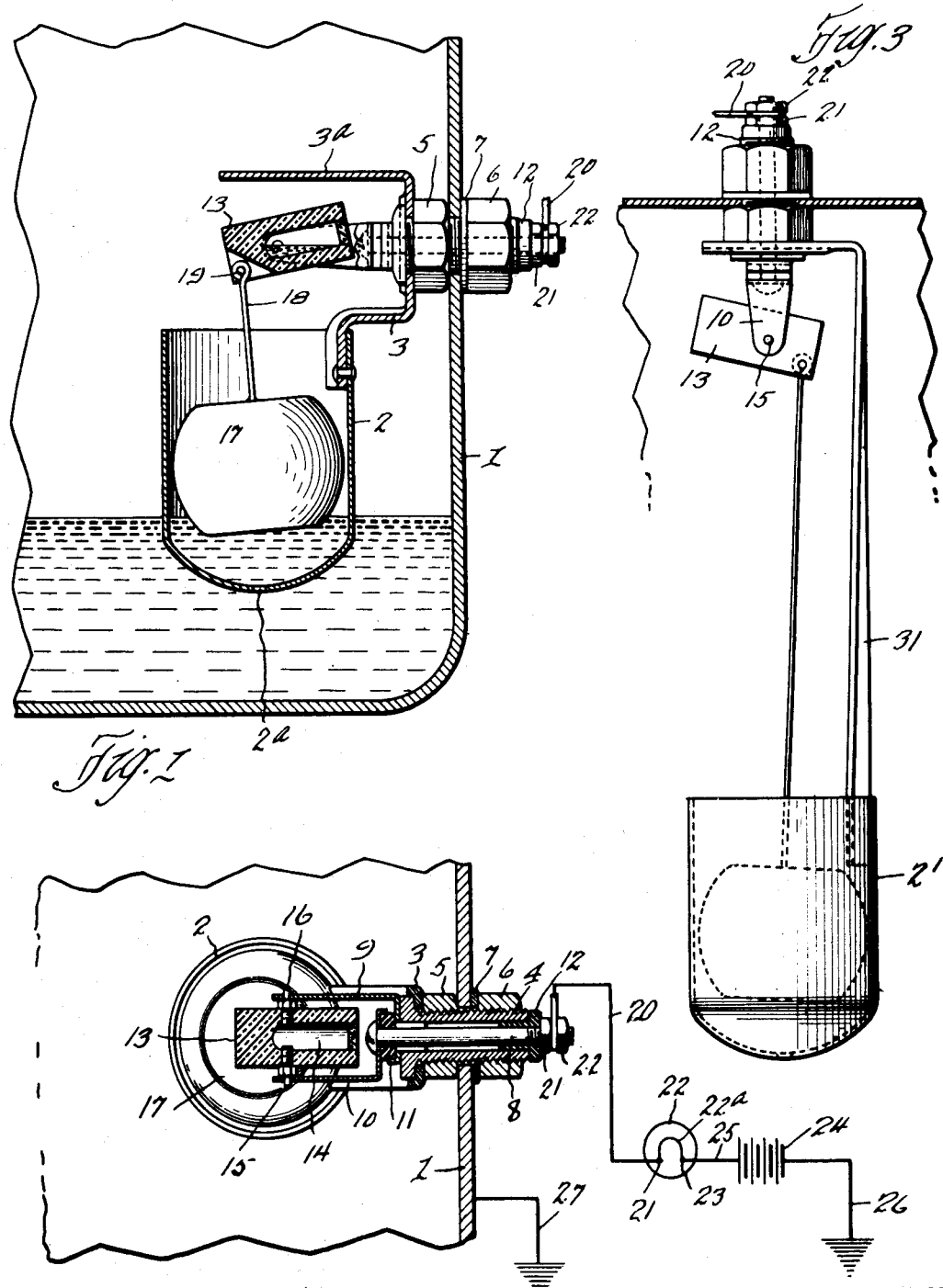
INVENTOR
Frank J. Brannen
BY
Hull, Brock & West
ATTORNEY Patented Dec. 8, 1931

1,835,007

UNITED STATES PATENT OFFICE

FRANK J. BRANNEN, OF CLEVELAND, OHIO

LIQUID LEVEL INDICATOR

Application filed July 8, 1929. Serial No. 376,687.

This invention relates generally to a liquid level indicator which is generally adapted for use in connection with indicating the level of liquid within any container or receptacle for any purpose whatsoever.

The embodiment of the invention herein disclosed is particularly adapted for use in connection with automobiles for indicating when the supply of gasoline within the gasoline tank has been reduced to a predetermined level. The device is equally applicable for use in connection with indicating when it is necessary to replenish the supply of oil in the crank case of the engine or for indicating when the supply of water in the radiator is low. The device operates in connection with a signal system for giving a signal or warning when the liquid level falls below a predetermined point so that the supply may be replenished.

The present embodiment of the invention is particularly designed and adapted for use as an automatic indicator and signalling device for use in connection with lubricating oil and gasoline tanks of motor vehicles, such as automobiles, trucks, tractors, and the like, as well as in connection with motor boats and airplanes of various types.

The main object of the invention is to provide a generally improved indicator and signal system of the character described which will be exceedingly simple in construction, efficient and safe in operation and well adapted for quantity production at comparatively low cost.

A further object of the invention is to provide a liquid level indicator of the character described in which practically all of the parts thereof may be formed of metal stampings and screw machine products thereby greatly reducing the cost of manufacture.

A further object of the invention is to provide a signal or indicating system of the character described which may be readily attached to or detached from any ordinary supply tank or receptacle used in connection with motor vehicles.

A still further object of the invention is to provide a liquid level indicator and signal system in which the parts are so constructed and arranged as to prevent the formation of any spark gaps or contacts which would be likely to cause explosion when used in connection with a combustible or volatile liquid and in which the liability of disarrangement or short circuiting is reduced to a minimum.

Further and more limited objects of the invention will appear as the description proceeds and by reference to the accompanying drawings in which Fig. 1 is a fragmentary vertical sectional view disclosing my improved indicating device attached to a liquid supply receptacle such as the crank case of an automobile; Fig. 2 is a fragmentary view partly in section and partly diagrammatic and disclosing the details of construction of the device; and Fig. 3 is a fragmentary view partly in vertical section and partly in side elevation disclosing one of my indicating devices arranged within a container such as the gasoline tank or radiator of an automobile.

Referring now to the drawings, reference character 1 designates a container or receptacle such as the crank case of an automobile, and adapted to contain a liquid. Arranged within the receptacle 1 is a cup or float chamber 2 having an opening $2^a$ in the bottom wall thereof. The cup 2 is preferably cylindrical in shape and has an arm 3 extending upwardly therefrom, as shown most clearly in Fig. 1. Extending through the wall of the receptacle 1 is a threaded stud 4 which is secured to the wall of the receptacle preferably by means of hexagonal nuts 5 and 6 and a washer 7. The stud 4 projects through an opening in the arm 3 and rigidly clamps the same in place. Extending through the stud 4 is a pin 8 which rigidly secures a pair of arms 9 and 10 to the stud 4, the arms 9 and 10 being insulated from each other by an insulating block 11. The outer end of the pin 8 is insulated from the stud 4 by means of an insulating collar 12. Carried by the arms 9 and 10 and pivotally secured thereto is an oscillatory switch block 13 having a cavity 14 therein. The switch block 13 is provided with axle terminals 15 and 16 the outer ends of which are journaled in openings in the arms 9 and 10, respectively. The inner ends of the axle terminals 15 and 16 project into the cavity 14 and serve as electrodes in a manner to be hereinafter described. It will therefore be seen that the oscillatory block 14 is pivotally supported by the arms 9 and 10. The cavity 14 is adapted to contain a sufficient quantity of mercury to bridge the electrodes 15 and 16 when the switch block is moved to a predetermined position, as shown most clearly in Fig. 1. Arranged within the cup 2 is a float 17 which is operatively connected with one end of the switch block by a connecting link 18 secured to a pin 19 carried by the switch block. Connected with the outer end of the pin 8 is an electrical conductor 20 which is secured to the pin by means of nuts 21 and 22. The opposite end of the conductor 20 is connected with a terminal 21 of a lamp 22. The opposite terminal 23 of the lamp is connected with a battery 24 by a conductor 25. The opposite side of the battery 24 is connected with the ground by means of a conductor 26. The container 1 is connected with the ground by means of a conductor 27. From the construction just described, it will be seen that the arms 9 and 10 are insulated from each other and that the arm 9 is grounded on the container 1 and that the arm 10 is in electrical circuit with the battery. When the level of liquid in the container 1 falls to the level shown in Fig. 1, the float will actuate the switch block and move it to the position shown in Fig. 1, in which position the mercury within the cavity 14 covers the electrodes 15 and 16. Current will then flow from the battery 24 through a conductor 25, terminal 23, lamp filament 22$^a$, terminal 21, conductor 20, pin 8, arm 10, terminal electrode 15 through the mercury in cavity 14 to the terminal 16, thence through the arm 9, container wall 1, conductor 27 to the ground, whereupon the lamp filament 22$^a$ will be energized, thus giving a visual indication that the level of liquid in the container has reached a predetermined point. The position of the cup 2 within the container 1 may be adjusted as desired depending upon when it is desired to have the signal operate. It is of course understood that I may make use of an audible signal instead of the electric lamp, if I so desire.

Assuming that the device is used for indicating the level of liquid in the crank case of an automobile, the operator will know that when the lamp is lighted the level of liquid in the crank case has fallen to a predetermined point and that the supply of lubricant needs replenishing. In the form of the invention shown in Figs. 1 and 2, the upper portion 3$^a$ of the arm 3 is bent over across the top of the switch block 13 so as to protect the same.

The form of the invention illustrated in Fig. 3 is identical with the form of the invention illustrated in Figs. 1 and 2 except that the device is adapted for use in connection with the gasoline tank or the radiator of an automobile, in which case, the cup 2' is somewhat larger and the arm 3' is considerably longer so as to permit the cup to be arranged a considerable distance below the top of the radiator. In other respects, the construction and operation of the form of the invention shown in Fig. 3 is identical with that shown in Figs. 1 and 2.

It is of course understood that various changes may be made in the details of construction and in the arrangement and manner of securing the various parts in position without departing from the spirit of my invention and that the embodiments of the invention herein disclosed are merely illustrative and are not to be considered in a limiting sense. The device is of general application and adapted for use for indicating the liquid level in any container or receptacle. It is therefore to be understood that my invention is limited only in accordance with the scope of the appended claims.

Having thus described my invention, what I claim is:

1. In a liquid level indicator, the combination of a container adapted to contain a liquid, of a cup arranged within said container in open communication with the interior thereof and having an arm extending upwardly therefrom, a stud securing said arm to the wall of the container, an oscillatory switch carrying member carried by said stud, a float arranged within said cup and operatively connected with said switch carrying member, said switch carrying member having a cavity therein and a pair of oppositely disposed axle terminals the inner ends of which project into said cavity and serve as electrodes, and a freely movable contact element arranged within said cavity and adapted to bridge said electrodes when the switch carrying member is moved to a predetermined position, said electrodes being connected in electrical circuit.

2. In a liquid level indicator, the combination of a container adapted to contain a liquid, of a cup arranged in open communication with the interior of said container and having an arm projecting upwardly therefrom, a stud extending through the wall of said container and through said arm, a pair of arms supported by the inner end of said stud and insulated from each other, an oscillatory switch block pivotally supported by said pair of arms, said switch block having a cavity therein and a pair of oppositely disposed axle terminals the inner ends of which project into said cavity, a float arranged within said cup and operatively connected with said switch block, and a movable contact element within said cavity adapted to bridge the inner ends of said axle terminals when the switch block is moved to a predetermined position, said axle terminals being connected in electrical circuit with a signal system.

3. In a liquid level indicator of the character described, a float housing provided with means for attaching the same to a liquid receptacle, said means embodying a stud which passes through the wall of the receptacle and rigidly supports said float housing, a pair of arms supported by the inner end of said stud and insulated from each other, a switch block pivotally mounted between said pair of arms, said switch block having a pair of axle terminals constituting electrodes the inner ends of which project into said cavity, a float arranged within said float housing and operatively connected to said switch block, a mercury contact element within said cavity adapted to make or break the circuit through said electrodes, said pair of arms being in electric circuit with a signal system.

4. In a liquid level indicating device of the character described, a liquid supply container, a float chamber arranged within said container and having an arm projecting upwardly therefrom, a member rigidly connecting said arm with the wall of said container, a pair of arms carried by the inner end of said member and insulated one from the other, a switch block pivotally supported between said pair of arms and having a cavity therein, said switch block having a pair of oppositely disposed axle terminals, the outer ends of which are journaled in said arms respectively and the inner ends of which project into said cavity and constitute electrodes, a float in said float chamber operatively connected with said switch block and adapted to move said switch block when the liquid level in said container falls below a predetermined point, said pair of arms being connected in electrical circuit with a signal system.

5. The combination with a tank, of a bracket within the tank, said bracket being provided with an opening, a supporting stud for said bracket, extending through a wall of the tank and through said opening in said bracket, a float chamber supported by said bracket, an oscillating switch also supported by said stud, a float in the chamber connected to the movable member of the switch, and conductors connected to the switch and one of said conductors extending through the stud.

6. In a liquid level indicator, the combination of a container adapted to contain a liquid, of a cup arranged in open communication with the interior of said container and having an arm projecting upwardly therefrom, a stud extending through the wall of said container and through said arm, a pivotally mounted switch supported by said stud and including a pair of contacts and a gravity operated bridging means adapted to bridge said contacts in predetermined positions of said switch, one of said contacts being electrically connected with a terminal on said stud outside said container and adapted to be connected in circuit with a signal system.

In testimony whereof, I hereunto affix my signature.

FRANK J. BRANNEN.